United States Patent
Duffy et al.

(10) Patent No.: US 10,901,808 B2
(45) Date of Patent: *Jan. 26, 2021

(54) CONCURRENT MUTATION OF ISOLATED OBJECT GRAPHS

(71) Applicant: Microsoft Technology Licensing, LLC, Redmond, WA (US)

(72) Inventors: John J. Duffy, Renton, WA (US); Niklas Gustafsson, Bellevue, WA (US); Vance Morrison, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/423,241

(22) Filed: Feb. 2, 2017

(65) Prior Publication Data
US 2017/0147412 A1 May 25, 2017

Related U.S. Application Data

(63) Continuation of application No. 12/429,874, filed on Apr. 24, 2009, now Pat. No. 9,569,282.

(51) Int. Cl.
*G06F 9/46* (2006.01)
*G06F 9/52* (2006.01)
*G06F 21/78* (2013.01)

(52) U.S. Cl.
CPC .............. *G06F 9/526* (2013.01); *G06F 9/468* (2013.01); *G06F 21/78* (2013.01)

(58) Field of Classification Search
CPC . G06F 9/52; G06F 9/526; G06F 9/468; G06F 21/78
(Continued)

(56) References Cited

U.S. PATENT DOCUMENTS 5,075,845 A 12/1991 Lai et al.
5,175,851 A 12/1992 Johnson et al.
(Continued)

FOREIGN PATENT DOCUMENTS

CN 101055518 10/2007
CN 101082866 12/2007
(Continued)

OTHER PUBLICATIONS

"Lu et al";"On Ownership and Accessibility";"2006";"25 pages" (Year: 2006).*
(Continued)

*Primary Examiner* — Wei Y Zhen
*Assistant Examiner* — Brahim Bourzik
(74) *Attorney, Agent, or Firm* — Dicke, Billig & Czaja, PLLC (57) ABSTRACT

Fine-grained parallelism within isolated object graphs is used to provide safe concurrent operations within the isolated object graphs. One example provides an abstraction labeled IsolatedObjectGraph that encapsulates at least one object graph, but often two or more object graphs, rooted by an instance of a type member. By encapsulating the object graph, no references from outside of the object graph are allowed to objects inside of the object graph. Also, the encapsulated object graph does not contain references to objects outside of the graphs. The isolated object graphs provide for safe data parallel operations, including safe data parallel mutations such as foreach loops. In an example, the ability to isolate the object graph is provided through type permissions.

20 Claims, 4 Drawing Sheets

(58) Field of Classification Search
USPC ........................................................ 717/150
See application file for complete search history.

(56) References Cited

U.S. PATENT DOCUMENTS

| | | | |
|---|---|---|---|
| 5,375,215 A | 12/1994 | Hanawa et al. | |
| 5,454,108 A | 9/1995 | Devarakonda et al. | |
| 5,459,871 A | 10/1995 | Van Den Berg | |
| 5,682,537 A | 10/1997 | Davies et al. | |
| 5,765,153 A | 6/1998 | Benantar et al. | |
| 5,787,431 A | 7/1998 | Shaughnessy | |
| 6,009,269 A | 12/1999 | Burrows et al. | |
| 6,092,156 A | 7/2000 | Schibinger et al. | |
| 6,182,277 B1 | 1/2001 | DeGroot et al. | |
| 6,381,734 B1* | 4/2002 | Golde | G06F 9/449 |
| | | | 717/165 |
| 6,542,891 B1 | 4/2003 | Loen et al. | |
| 6,601,120 B1 | 7/2003 | Schimmel | |
| 6,604,109 B1 | 8/2003 | Federighi et al. | |
| 6,625,603 B1* | 9/2003 | Garg | G06F 9/468 |
| | | | 707/758 |
| 6,721,747 B2 | 4/2004 | Lipkin | |
| 6,810,363 B2 | 10/2004 | Newman et al. | |
| 6,817,009 B2 | 11/2004 | Flanagan et al. | |
| 6,925,638 B1 | 8/2005 | Koved et al. | |
| 7,013,469 B2 | 3/2006 | Smith et al. | |
| 7,058,655 B2 | 6/2006 | Goldberg et al. | |
| 7,086,065 B1 | 8/2006 | Yeluripati et al. | |
| 7,165,150 B2 | 1/2007 | Alverson et al. | |
| 7,188,344 B1 | 3/2007 | Blue | |
| 7,209,918 B2 | 4/2007 | Li | |
| 7,240,331 B2 | 7/2007 | Vion-Dury et al. | |
| 7,316,005 B2 | 1/2008 | Qadeer et al. | |
| 7,437,741 B2 | 10/2008 | Crisan | |
| 7,469,403 B2 | 12/2008 | Choi et al. | |
| 8,032,859 B2 | 10/2011 | Meijer et al. | |
| 8,316,369 B2 | 11/2012 | Laksberg et al. | |
| 8,380,965 B2 | 2/2013 | Bouillet et al. | |
| 8,495,329 B2 | 7/2013 | Duffy et al. | |
| 8,566,544 B2 | 10/2013 | Gustafsson et al. | |
| 9,229,959 B2* | 1/2016 | Katzenberger | G06F 16/20 |
| 10,740,550 B1* | 8/2020 | Bosworth | G06F 21/6209 |
| 2002/0107874 A1 | 8/2002 | DeLorme et al. | |
| 2002/0138819 A1* | 9/2002 | Hills | G06F 9/4492 |
| | | | 717/114 |
| 2003/0131348 A1 | 7/2003 | Hogstrom et al. | |
| 2003/0135576 A1 | 7/2003 | Bodin | |
| 2004/0143710 A1 | 7/2004 | Walmsley | |
| 2004/0193388 A1 | 9/2004 | Outhred | |
| 2004/0199572 A1 | 10/2004 | Hunt | |
| 2004/0205392 A1 | 10/2004 | Wu | |
| 2005/0108695 A1* | 5/2005 | Li | G06F 8/456 |
| | | | 717/144 |
| 2005/0149914 A1 | 7/2005 | Krapf et al. | |
| 2005/0198619 A1 | 9/2005 | Crisan et al. | |
| 2006/0015528 A1 | 1/2006 | Hejlsberg et al. | |
| 2006/0156286 A1* | 7/2006 | Morgan | G06F 8/51 |
| | | | 717/124 |
| 2006/0248131 A1 | 11/2006 | Marwinski et al. | |
| 2007/0005658 A1 | 1/2007 | Myllymaki | |
| 2007/0078890 A1 | 4/2007 | Hsu et al. | |
| 2007/0130621 A1 | 6/2007 | Marinescu et al. | |
| 2007/0143335 A1 | 6/2007 | Antoch et al. | |
| 2007/0261043 A1 | 11/2007 | Ho et al. | |
| 2007/0282916 A1 | 12/2007 | Albahari et al. | |
| 2007/0288538 A1 | 12/2007 | Bacon et al. | |
| 2008/0077922 A1 | 3/2008 | Doring | |
| 2008/0162552 A1 | 7/2008 | Bonev et al. | |
| 2008/0163124 A1 | 7/2008 | Bonev et al. | |
| 2008/0209433 A1 | 8/2008 | McKenny | |
| 2008/0222602 A1 | 9/2008 | Vazirl-Farahani et al. | |
| 2008/0313613 A1 | 12/2008 | Bierhoff et al. | |
| 2009/0138850 A1 | 5/2009 | Yamaoka | |
| 2009/0193417 A1 | 7/2009 | Kahlon | |
| 2009/0198899 A1 | 8/2009 | Revanuru | |
| 2009/0327999 A1 | 12/2009 | Duffy et al. | |
| 2009/0328047 A1 | 12/2009 | Li et al. | |
| 2010/0262801 A1* | 10/2010 | Duffy | G06F 9/52 |
| | | | 711/164 |
| 2010/0275191 A1 | 10/2010 | Duffy et al. | |
| 2011/0161604 A1 | 6/2011 | Laksberg et al. | |
| 2011/0161610 A1 | 6/2011 | Gustafsson et al. | |
| 2011/0161962 A1 | 6/2011 | Laksberg et al. | |
| 2014/0108438 A1 | 4/2014 | Duffy et al. | |
| 2020/0201789 A1* | 6/2020 | Durham | G06F 9/30098 |

FOREIGN PATENT DOCUMENTS

| | | |
|---|---|---|
| CN | 100373338 C | 3/2008 |
| CN | 101981545 A | 2/2011 |
| JP | 2005339534 A | 12/2005 |
| KR | 19980079611 | 11/1998 |
| WO | 0203198 | 1/2002 |
| WO | 2005043388 | 5/2005 |
| WO | 2006039239 | 4/2006 |

OTHER PUBLICATIONS

"Bierhoff et al";"Modular Typestate Checking of Aliased Objects";"2007";"19 pages" (Year: 2007).*
"Mitchell et al";"the runtime structure of object ownership"; 25 pages (Year: 2006).*
Stasenko, Igor, "Re: [squeak-dev] Re: The solution of (Was: Creating An Image From First Principles)", retrieved at <<http://www.nabble.com/Re:--squeak-dev--Re:-The-solution-of-(Was:-Creating-an-image-from-first-principles)-p18860090.html>>, Aug. 7, 2008, pp. 3.
Garg, et al., "Type-Directed Concurrency", retrieved at <<http://citeseerx.ist.psu.edu/viewdoc/summary?doi=10.1.1.61.1659>>, pp. 1-15.
Boyapati, et al., "Ownership Types for Safe Programming: Preventing Data Races and Deadlocks", retrieved at <<http://www.eecs.umich.edu/~bchandra/publications/oopsla02.pdf>>, ACM Conference on Object-Oriented Programming, Systems, Languages and Applications (OOPSLA), Nov. 2002, pp. 211-230.
Aditya, et al., "A Type System for Functional Imperative Programming (Technical Summary)", retrieved at <<http://csg.csail.mit.edu/pubs/memos/Memo-368/memo-368.pdf>>, Jul. 1994, pp. 19.
Gifford, et al., "Integrating Functional and Imperative Programming", retrieved at <<http://delivery.acm.org/10.1145/320000/319848/p28-gifford.pdf?key1=319848&key2=3891481321&coll=GUIDE&dl=GUIDE&CFID=17666327&CFTOKEN=64628890>>, ACM, 1986, pp. 28-38.
Beckman, Nels E., "Verifying Correct Usage of Atomic Blocks using Access Permissions", retrieved at <<http://www.cse.unl.edu/~grother/isstadoc-papers/beckman.pdf>>, pp. 4.
Flanagan, et al., Types for Safe Locking, retrieved at <<http://citeseerx.ist.psu.edu/viewdoc/summary?doi=10.1.1.36.849>>, pp. 18.
"Yi Lu and John Potter";"On Ownership and Accessibility";"2006";"Springer-Verlag Berlin Heidelberg";"25 Pages".
The Office Action for U.S. Appl. No. 12/429,874 dated Mar. 29, 2012 (19 pgs.).
The Final Office Action for U.S. Appl. No. 12/429,874 dated Oct. 26, 2012 (21 pgs.).
The Office Action for U.S. Appl. No. 12/429,874 dated Jan. 31, 2014 (22 pgs.).
The Final Office Action for U.S. Appl. No. 12/429,874 dated Aug. 19, 2014 (29 pgs.).
The Office Action for U.S. Appl. No. 12/429,874 dated Jan. 16, 2015 (37 pgs.).
The Final Office Action for U.S. Appl. No. 12/429,874 dated Aug. 6, 2015 (23 pgs.).
The Office Action for U.S. Appl. No. 12/429,874 dated Dec. 24, 2015 (20 pgs.).
The Final Office Action for U.S. Appl. No. 12/429,874 dated Jun. 30, 2016 (21 pgs.).
The Notice of Allowance for U.S. Appl. No. 12/429,874 dated Oct. 4, 2016 (19 pgs.).

(56) References Cited

OTHER PUBLICATIONS

The International Search Report, dated Nov. 4, 2010, Application No. PCT/US2010/029716, Filed Date: Apr. 1, 2010, pp. 6.
The Written Opinion, dated Nov. 4, 2010, Application No. PCT/US2010/029716, Filed Date: Apr. 1, 2010, pp. 4.
The Office Action for U.S. Appl. No. 12/422,764 dated Aug. 1, 2011 (20 pgs).
The Final Office Action for U.S. Appl. No. 12/422,764 dated Dec. 15, 2011 (15 pgs).
The Office Action for U.S. Appl. No. 12/422,764 dated Oct. 25, 2012 (18 pgs).
Zibin, Yoav et al., "Object and Reference Immutability Using Java Generics," Proceedings of the 6th Joint Meeting of the European Software Engineering Conference and the ACM Sigsoft Symposium on the Foundations of Software Engineering, pp. 10 (Jan. 2007).
The Supplemental European Search Report for Application No. EP 10 76 4898 dated Dec. 18, 2012 (9 pgs).
The Notice of Allowance for U.S. Appl. No. 12/422,764 dated Mar. 18, 2013 (10 pgs).
The Notice of Allowance for U.S. Appl. No. 12/163,868 dated Sep. 8, 2014 (25 pgs).
The Notice of Allowance for U.S. Appl. No. 12/163,868 dated May 13, 2014 (14 pgs).
The Final Office Action for U.S. Appl. No. 12/163,868 dated Dec. 19, 2013 (44 pgs).
Prentice Hall "Visual C++® 2008: How to Program, Second Edition" By: P. J.Deitel & Associates, Dec. 31, 2007, p. 445.
The Office Action for U.S. Appl. No. 12/163,868 dated Jun. 7, 2013 (42 pgs).
Bea "Weblogic Integration 2.1 documentation: Class SOMType", 2000, pp. 1-14, [online][retrieved on May 29, 2013]. Retrieved from <http://docs.oracle.com/cd/E 13214_01 /wlintegration/v2_1 /classdocs/com/bea/schema/type/SOMType. html>.
The Final Office Action for U.S. Appl. No. 12/163,868 dated Feb. 19, 2013 (39 pgs).
The Office Action for U.S. Appl. No. 12/163,868 dated Aug. 10, 2012 (37 pgs).
The Final Office Action for U.S. Appl. No. 12/163,868 dated Feb. 16, 2012 (23 pgs).
The Office Action for U.S. Appl. No. 12/163,868 dated Oct. 7, 2011 (22 pgs).
Tschantz, et al., "Javari: Adding Reference Immutability to Java", Proceedings of the 20th annual ACM SIGPLAN conference on Object oriented programming systems languages and applications, vol. 40, Issue 10 Oct. 2005, pp. 211-214.
Zibin, et al., "Object and Reference Immutability using Java Generics", Computer Science and Artificial Intelligence Laboratory Technical Report, Mar. 16, 2007, 14 pages.
Michael D. Ernst, "Annotations on Java Types", Nov. 12, 2007, pp. 1-34.
Jan Schafer, "Encapsulation and Specification of Object-Oriented Runtime Components", Sep. 30, 2004, 89 pages.
Artzi, et al., "Combined Static and Dynamic Mutability Analysis", Computer Science and Artificial Intelligence Laboratory Technical Report, Mar. 23, 2007, 19 pages.
"First Office Action received in China Patent Application No. 201 080017093.9", dated Nov. 4, 2013, Filed Date: Apr. 1, 2010,14 Pages.
Bierhoff, et al., "Modular Typestate Checking of Aliased Objects", In Proceedings of the 22nd Annual ACM 2 SIGPLAN Conference on Object-oriented Programming Systems and Applications, vol. 42, Issue 10, Oct. 25, 2007, pp. 301-320.
"Office Action Received in European Patent Application No. 10764898. 2", dated Feb. 3, 2014, Filed Date: Apr. 1, 2010, 5 Pages.
Colin S. Gordon, et, al., Uniqueness and Reference Immutability for Safe Parallelism, University of Washington, US 20 pages.
The Office Action for U.S. Appl. No. 12/649,255 dated Oct. 3, 2014 (22 pgs).
The Office Action for U.S. Appl. No. 12/649,255 dated Jun. 20, 2013.
The Notice of Allowance for U.S. Appl. No. 12/649,252 dated Jun. 24, 2013 (13 pgs).
The Office Action for U.S. Appl. No. 12/649,254 dated Apr. 10, 2012.
The Notice of Allowance for U.S. Appl. No. 12/649,254 dated Aug. 8, 2012.
The Office Action for U.S. Appl. No. 12/649,252 dated Mar. 4, 2013 (9 pages).
Thought Exercise: Axum + F#: Isolation, Agents, and Message-passing in .NET—Published Date: Mar. 31, 2009 http://blogs.msdn.com/maestroteam/ (26 pages).
Stork et al., Concurrency by Default Using Permissions to Express Dataflow in Stateful Programs—Published Date: Oct. 25-29, 2009 http://www.cs.cmu.edu/~aldrich/papers/onward2009-concurrency.pdf (8 pages).
Isolation in Maestro: Isolation, Agents, and Message-passing in .NET—Published Date: 2009 http://blogs.msdn.com/maestroteam/archive/2009/02/27/isolation-in-maestro.aspx (7 pages).
Axum, Microsoft's Approach to Parallelism—Published Date: Apr. 23, 2009 http://www.infoq.com/news/2009/04/Axum (2 pages).
Greenhouse et al, Assuring and Evolving Concurrent Programs: Annotations and Policy—Published Date: May 19-25, 2002http://fluid.cs.cmu.edu:8080/Fluid/fluid-publications/p453-greenhouse.pdf (11 pages).
Taming Your Sequence's Side-Effects through IEnumerable.Let—Published Date: Sep. 12, 2009 http://bartdesmet.net/blogs/bart/archive/2009/09/12/taming-your-sequence-s-side-effects-through-ienumerable-let.aspx (20 pages).
Kieburtz, Taming Effects with Monadic Typing1—Published Date: 1998 http://delivery.acm.org/10.1145/290000/289428/p51-kieburtz.pdf?key1=28942&key2=9659755521&coll=GUIDE&dl=GUIDE&CFID=56555689&CFTOKEN=92779120 (12 pages).
Andrade et al., Software Synthesis from Dataflow Models for G and LabVIEW—Published Date Mar. 16, 1998 http://users.ece.utexas.edu/~bevans/courses/ee382c/projects/spring98/andrade-kovner/litsurvey.pdf (9 pages).
Ha et al., Compile-Time Scheduling of Dynamic Constructs in Dataflow Program Graphs, IEEE Transactions of Computers, vol. 46, No. 7, Published Date: Jul. 1997 http://ptolemy.eecs.berkeley.edu/publications/papers/97/compile/compile.pdf (12 pages).
Munnich, Pred-DF—A Data Flow Based Semantic Concurrency Control Protocol for Real-Time Main-Memory Database Systems—Published Date: 2000 http://ieeexplore.ieee.org/stamp/stamp.jsp?tp=&arnumber=896428&isnumber=19358 (5 pages).
Cox et al., Adding Parallelism to Visual Data Flow Programs—Published Date—2005 http://users.cs.dal.ca/~arc/publications/2-36/paper.pdf (10 pages).
Templ et al., Lock-Free Synchronization of Date Flow between Time-Triggered and Event-Triggered Activities in a Dependable Real-Time System—Retrieved Date: Oct. 14, 2009 http://embeddedcmmi.at/fileadmin/src/docs/publications/C088.pdf (6 pages).
Leung et al., Data Race: Tame the Beast,—Published Date 2009 http://www.cs.otago.ac.nz/research/publications/oucs-2009-01.pdf (11 pages).
Nienaltowski, Efficient Data Race and Deadlock Prevention in Concurrent Object-Oriented Programs—Published Date: 2004 http://se.inf.ethz.ch/people/nienaltowski/papers/oopsla04.pdf (2 pages).
The International Preliminary Report on Patentability for International Application No. PCT/US2010/029716 dated Oct. 27, 2011 (6 pages).
"International Search Report & Written Opinion for PCT Patent Application No. PCT/US2013/065139", dated Jan. 30, 2014, Filed Date: Oct. 15, 2013, 8 Pages.
"Boyapati et al"; "Ownership Types for Object Encapsulation"; "Jan. 15-17, 2003"; "11 pages".
"Notice of Allowance Issued in Korean Patent Application No. 10-2015-7009591", dated Dec. 19, 2019, 3 Pages.
"Office Action Issued in European Patent Application No. 10764898. 2", dated Jan. 8, 2018, 6 Pages.
"Final Office Action Issued in U.S. Appl. No. 13/652,436", dated May 14, 2015, 20 Pages.

(56) References Cited

OTHER PUBLICATIONS

"Final Office Action Issued in U.S. Appl. No. 13/652,436", dated Aug. 2, 2017, 33 Pages.
"Non Final Office Action Issued in U.S. Appl. No. 13/652,436", dated Nov. 1, 2016, 21 Pages.
"Non Final Office Action Issued in U.S. Appl. No. 13/652,436", dated Oct. 3, 2014, 14 Pages.
"Office Action Issued in European Patent Application No. 13789915.9", dated Feb. 4, 2016, 4 Pages.
"Office Action Issued in Chinese Patent Application No. 201080017093.9", dated Jul. 15, 2014, 10 Pages.
"Office Action Issued in Chinese Patent Application No. 201080017093.9", dated Jan. 13, 2015, 6 Pages.
"Office Action Issued in Chinese Patent Application No. 201080017093.9", dated Jul. 13, 2015, 6 Pages.
"First Office Action and search Report Issued in Chinese Patent Application No. 201380053879.X", dated Feb. 23, 2017, 13 Pages.
"Office Action Issued in Japanese Patent Application No. 2015-537021", dated Aug. 23, 2017, 4 Pages.

* cited by examiner

CONCURRENT MUTATION OF ISOLATED OBJECT GRAPHS

CROSS-REFERENCE TO RELATED APPLICATIONS

This patent application is a continuation of Ser. No. 12/429,874, filed Apr. 24, 2009, entitled, "CONCURRENT MUTATION OF ISOLATED OBJECT GRAPHS," which is incorporated herein by reference.

BACKGROUND

Concurrent programming for shared-memory multiprocessors can include the ability for multiple threads to access the same data. The multiple threads execute on multiple processors, multiple processor cores, or other classes of parallel hardware architecture involving a memory system shared among the processors. The shared-memory model is the most commonly deployed method of multithreaded communication. In such systems, concurrent threads can attempt to access and modify the same data in the shared-memory and perform side effects on this data and the real world through input/output. This can lead to race conditions and other undesired effects in concurrent programming and the stored data.

A major difficulty in implementing concurrent programming involves protecting the state of concurrently accessed data to avoid these undesired effects. Developers often rely on a form of synchronization for concurrency safety. Synchronization often involves the use of locks, which is a form of pessimistic concurrency control mechanism that prevents all other threads from accessing certain data while one thread is already doing so. Locks provide synchronization often at the expense of performance and scalability. Newer synchronization technologies, such as those based on optimistic concurrency control (like Software Transaction Memory), provide far superior performance and scalability than locks. But all contemporary synchronization mechanisms, even optimistic concurrency control systems, eventually provide scalability issues in concurrent programming: when threads wait for another, scalability drops; shared-memory systems use caches whose performance drops significantly when threads share access to memory; and so on.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The examples are directed to fine-grained parallelism within isolated object graphs to provide safe concurrent mutation of data within the isolated object graphs. One example provides an abstraction labeled IsolatedObjectGraph<T> to encapsulate a whole object graph rooted by a single object of type T. By encapsulating the object graph, no references from outside of the object graph are allowed to point at objects inside of the object graph, and similarly, the object graph does not contain references to objects outside of the graph. The isolated object graphs provide for safe data parallel operations, including safe data parallel mutations via foreach loops. In one example, an imperative framework provides for statically proving the object graph to be isolated. The object graph can be statically proven to continue to be isolated after objects within the object graph are run, read, and/or written. In an example, the ability to isolate the object graph is provided through type permissions.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
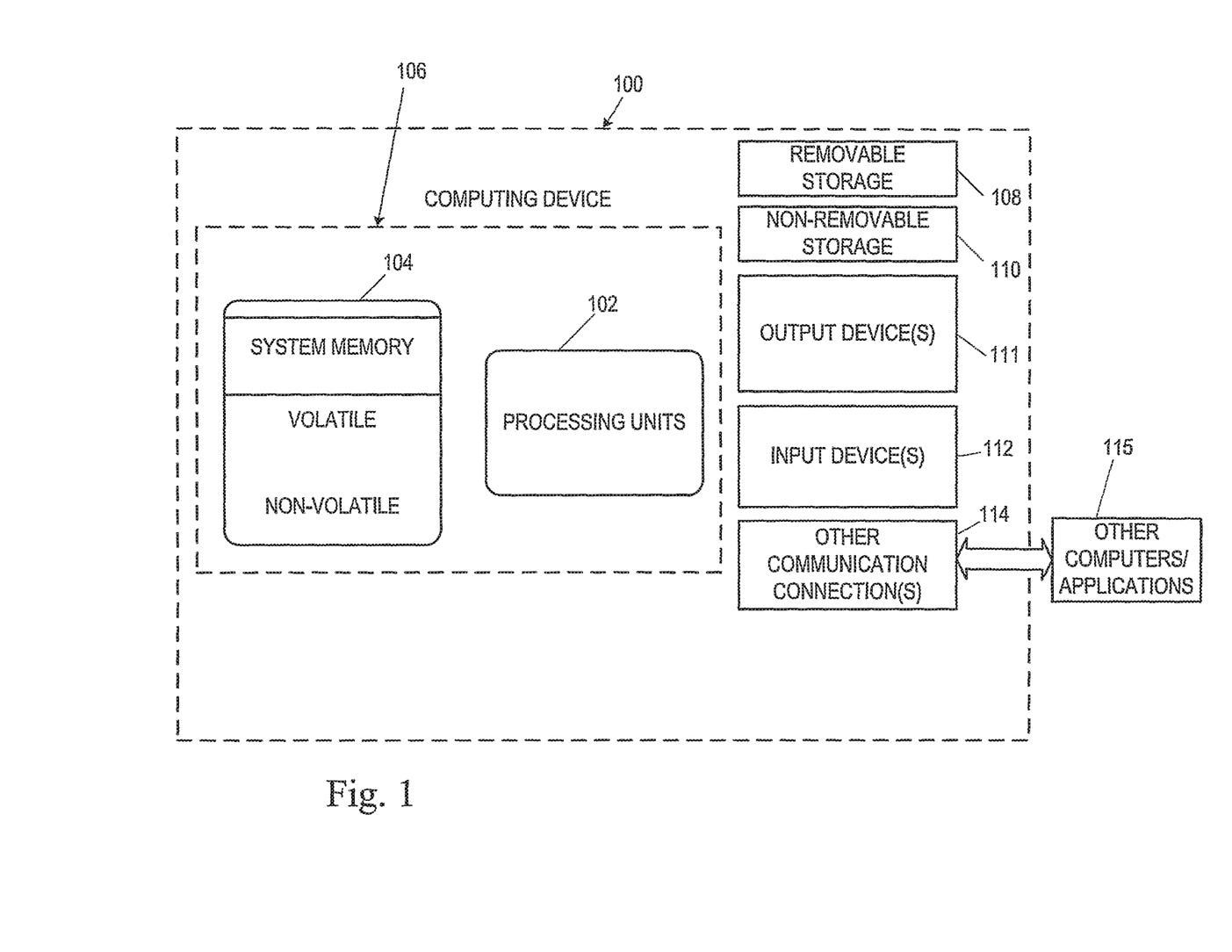
FIG. 1 is a block diagram illustrating an example computing system.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a personal computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment. The managed environment typically includes a virtual machine that allows the software applications to run in the managed environment so that the developers need not consider the capabilities of the specific processors 102.

The runtime is used only as an example. The embodiments of the disclosure below are not, however, confined to be used in a managed execution environment and are not confined to any runtime requirement. Rather, the embodiments are implemented in a type system. Accordingly, it is contemplated that embodiments can be implemented in C++ or other native code.

Figure 2:
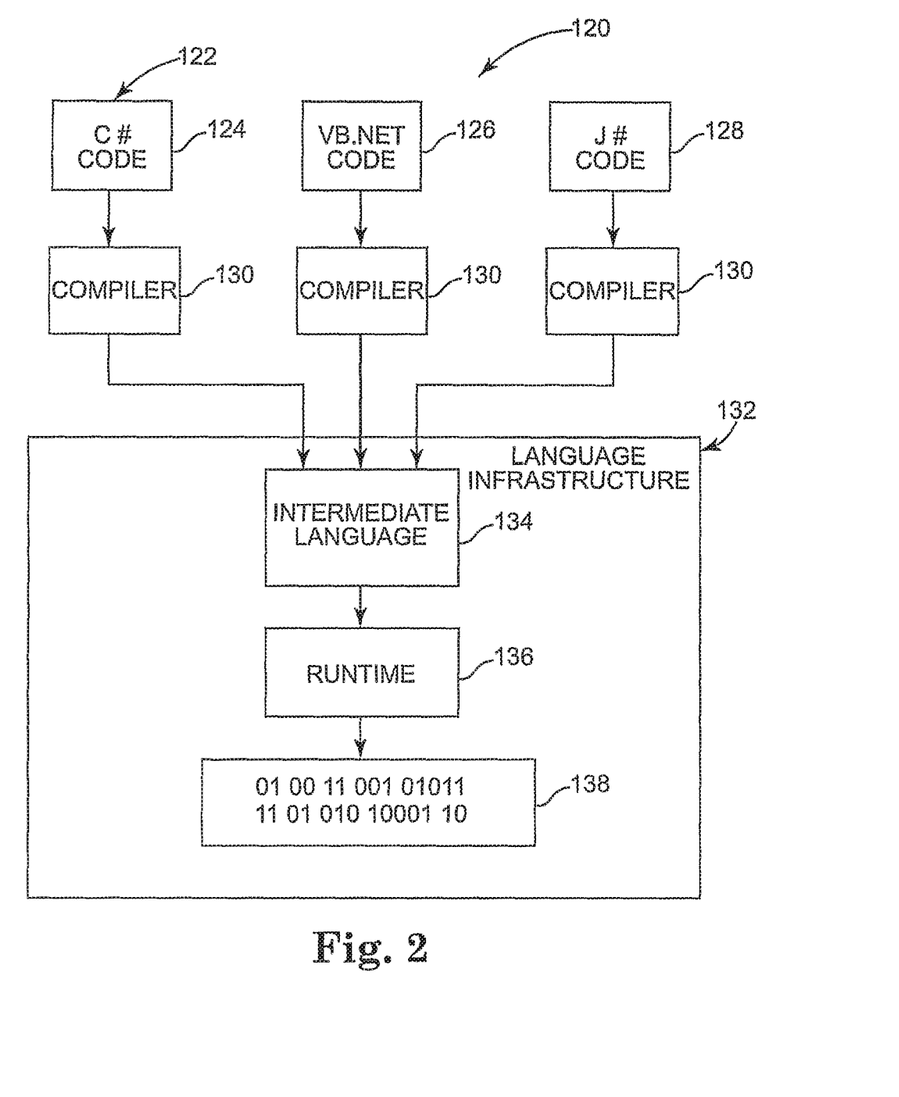
FIG. 2 is a block diagram illustrating one example embodiment of a managed environment operating on a computing system, such as the computing system of FIG. 1.

FIG. 2 illustrates an example embodiment of a managed, or runtime, environment 120 suitable for operation with a computing device, such as the computing device 100. Particular current examples of managed environment frameworks include that sold under the trade designation of .Net from Microsoft Corp. of Redmond, Wash., United States, and Java from Sun Microsystems, Inc. of Santa Clara, Calif., United States, as well as others. The managed environment 120 is configured to accept programs written in a high-level compatible code of one or more programming languages 122. For example, the managed environment can accept programs written in programming languages such as C-sharp (C#) code 124, a visual basic type language such as VB.NET code 126, and a Java type language (such as J-sharp) 128. Compilers 130 are configured to compile each compatible code 124, 126, 128. The compiled code can be provided to an infrastructure 132 that describes an executable code and a runtime environment that describes a number of runtimes. An example infrastructure is Common Language Infrastructure (CLI). The infrastructure receives the compatible languages and converts them to a second and platform-neutral intermediate language 134, such as Common Intermediate Language (CIL). The intermediate language is provided to a runtime compiler 136, such as the Microsoft Common Language Runtime (CLR) in the .NET framework, that compiles the intermediate language into a machine readable code 138 that can be executed on the current platform or computing device.

To enable the runtime to provide service to the managed code, language compilers emit metadata that describes, among other things, the types in the code. A great majority of programming languages explicitly include the notion of "data types" and "type systems" although different languages may include different terminology to describe these features. A data type is an attribute of a corresponding data that describes some features about the data such as a set of legal values and allowable operations on the values. A data type is metadata for the corresponding data. A type gives meaning to data because hardware of the computing device 100 does not make a distinction between memory addresses, instruction code, integers, floating point numbers, and the like. A type system associates the type or types with each program value and attempts to prove that no program errors occur. This is often verified with the language complier 136, such as the C# compiler, CLR verifier, or C++ compiler.

Examples below describe a platform-wide capability for controlling side effects through an additional facet of the type system. Side effects are permitted when state is confined within a thread, which permits a form of concurrency safety without synchronization. Isolation support enables the type system to guarantee that certain state remains as it existed prior to a method call and to grant permission to mutate certain state. In the examples, an object reference (e.g. passed as an argument) can be tagged with an isolation permission modifier from a set of a plurality of isolation permission modifiers, stating what recipients of the reference can do with the object.

Other examples of controlling side effects exist, but none involve effect permissions to be carried out on typed references. Effects systems try to categorize the side effects allowed with a particular method. Functional programming languages, like Haskell, approach the problem in a wholly different way because they disallow side effects altogether. Haskell allows for the simulation of side-effects using a "state monad" and combined with the do combinator. This provides the illusion of an imperative style of programming, but it is modeled with functional monads and continuations.

Unlike the Haskell example, the disclosed examples operate on imperative programming languages such as C++, C#, and Java. Imperative programming is a computer programming paradigm that describes computation as a series of statements that change a program state modeling the real capabilities of traditional von Neumann architectures more directly. Imperative programming can be contrasted with functional programming, which avoids state and mutable data. For example, purely functional programs have no side effects, which are modifications of some state while returning a value. Imperative programming uses side effects to implement state and input/output functions.

Figure 3:
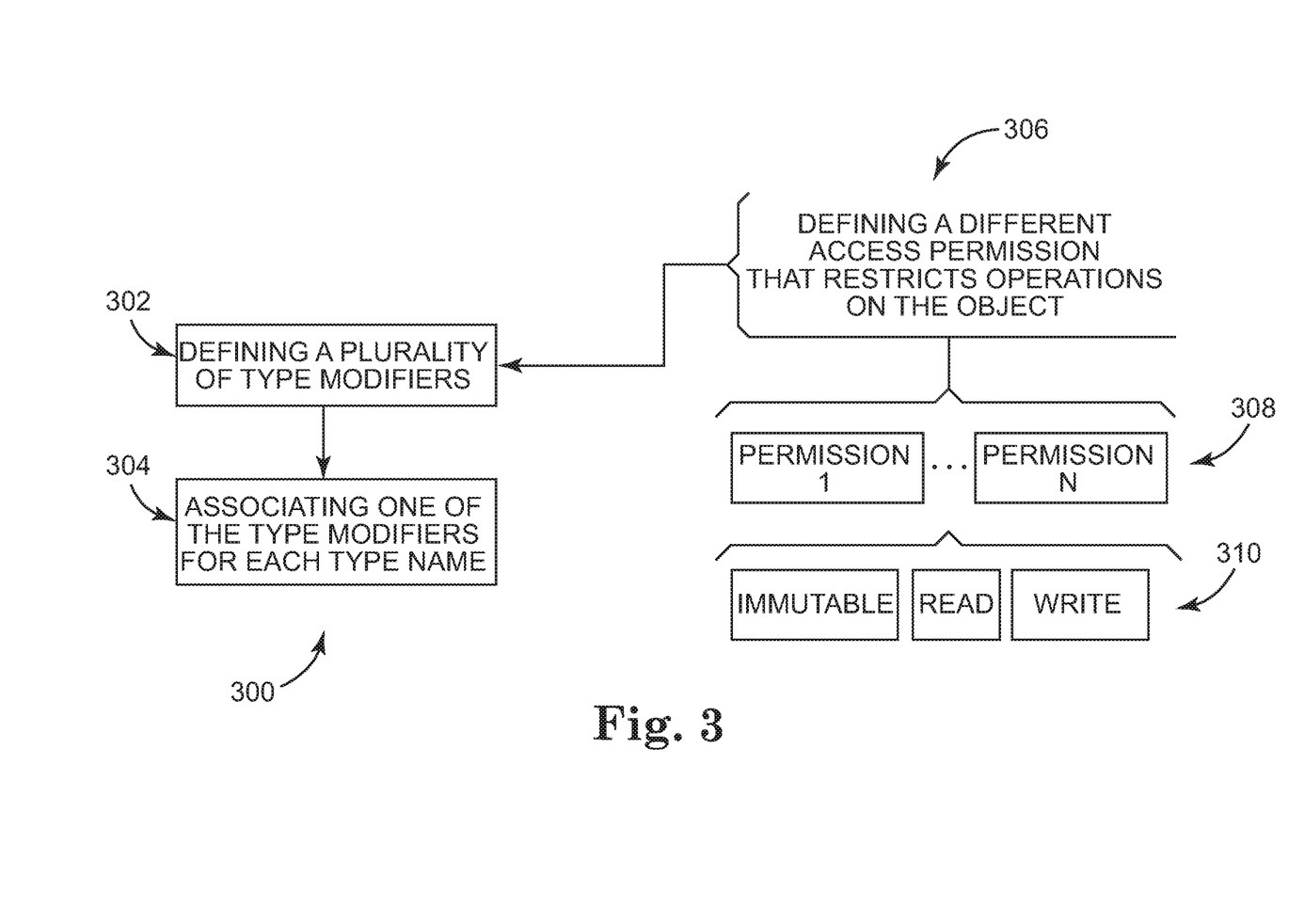
FIG. 3 is a flow diagram illustrating an example embodiment of a method of a managed environment, such as the managed environment of FIG. 2.

State isolation and definition of methods that preserve state isolation can be provided in this example through type permissions. FIG. 3 illustrates an example embodiment of a method 300 that can be implemented as part of a language compiler, such as the runtime environment or a managed framework on the computing device 100. Method 300 includes defining a plurality of type modifiers for controlling access to members through references pointing at an object at 302. One of the type modifiers is associated with each type name at 304. An aspect of defining a plurality of type modifiers includes defining a different access permission that restricts operation on the object at 306. When used with a type or isolated method, the type permission restricts what can be done to an object graph to which it points. The type permissions include at least two isolation modifiers at 308, such as "immutable" and "mutable," to control access to members through references.

In one example, three isolation modifiers are used including "immutable," "read," and "write" at 310. (More than three isolation modifiers are also contemplated to restrict what can be done with the objects.) An immutable reference points at an object possibly-shared among concurrent threads, but the state accessible through this modifier is statically proven not to change. A read reference also points to an object possibly-shared among concurrent threads, but no concurrent writes are permitted while such read references exist. In one example, this can include immutable access as well as reads of mutable fields. A write reference points either at an object that is not concurrently shared with another thread or at a shared object that has been provided with exclusive access so that writing can be done safely by the holder of such a reference.

A more particular example of the immutable-read-write permissions includes immutable-only, read-only, and read-write. An immutable-only (i) permission can be used only to read from immutable members. The object can be freely shared across threads and accessed concurrently, and the object will not incur concurrency issues. A read-only (r) permission can be used to read from any member, including mutable fields. The object may be unshared, or some form concurrency safety may be in place to allow concurrent reads. For example, a read lock can be held by a thread or some static control over references will cause the member to be free from concurrent writes. Or an object with read-write (w) permissions can be shared as read-only (r) across a fork-join barrier with structured data parallel constructs. A read-write (w) permission can be used to write to any member, and can include members with mutable fields. Some form of concurrency safety is in place to allow the writes. For example, an exclusive lock can be held, or the object is confined within a single thread.

The isolation permissions can make use of immutable fields in an imperative programming language. An immutable type is one where post-construction changes are not possible. One example used to establish an immutable type in an imperative language is the creation of support for "initonly" fields. An "initonly" indicates that variable assignment can only occur as part of the declaration or in a static constructor in the same class. An initonly field is one that is not written to once the object on which that field resides has been fully constructed. In this context, fully constructed means the constructer of the object has finished executing. Imperative languages can include a type system support that verifies this property, such as with the Common Language Runtime, and reject programs that do not adhere to the rules. An example of support for initonly fields includes "readonly" in the C# programming language.

Each occurrence of a type "T" can be associated with one of these modifiers in many numbers of ways. In one example, the notation T:x, is used where x is one of the isolation modifiers. In an example of three isolation modifiers, x can be: i=immutable-only, r=read-only, and w=read-write. For simplicity, the example notation T:x is used throughout the disclosure, but it is contemplated that other notations can be used. A program can specify an isolation modifier in any context where a type is to be named. Examples in a universal syntax, i.e., without regard to any specific programming language, using the notation T:x include:

a formal parameter declaration: void f(T:x foo) { . . . }.
a local variable declaration: void f( ) {T:x foo; . . . }
a field (state or instance) declaration: class C {private T:x m_foo; . . . }
a generic type parameter: class C<T> { . . . } void f( ) {C<T:x> foo; . . . } as well as others. Arrays can also be denoted as such, e.g. T:x[ ]:y.

In one implementation, the default access modifier is immutable or immutable-only (i) so that an unadorned type T is equivalent to T:i. Of note is that the isolation regions map to program scopes, however, and that program code outside of the isolation region can ignore the permission annotations in some implementations. This can serve to broaden the application of the isolation permissions as well a providing a runtime that is legacy friendly for existing code. In one implementation, static variables of type T cannot be "T:i" because the static variables are shared. In pass-by-value, the compiler copies the value of an argument in a calling function to a corresponding non-pointer or non-reference parameter in the called function definition. The parameter in the called function is initialized with the value of the passed argument. As long as the parameter has not been declared as constant, the value of the parameter can be changed. But the changes are only performed within the scope of the called function only. The changes have no effect on the value of the argument in the calling function.

In one implementation, the permissions are additive. For example, write (w) implies read (r), and read (r) implies immutable (i). In other words, T:w is effectively equivalent to T:irw, and T:r is effectively equivalent to T:ir. Thus, permissions can be removed safely, where T:w implicitly coerces to T:r, and T:r implicitly coerces to T:i. Thus, (w) can be considered a stronger permission than (r), or (r) is weaker than (w). Further, when a weaker reference is used to retrieve a stronger reference, the stronger reference is coerced to the weaker permission. For example, reading a U:w reference from an object reached via a T:i reference yields a U:i.

With the isolated permissions, concurrency safety can be extended to methods with an "isolated" method modifier, which indicates that the isolated method respects the isolation permissions. In one example, code of an isolated method "M" follows the isolation permissions. For instance, mutable fields in the type may not be read or written to for (i) references and may not be written to for (r) references. In some examples, M will not call non-isolated methods or invoke non-isolated delegates. During method or delegate invocation, M supplies actual input parameters that have the same or stronger permissions as their corresponding formal parameters. M supplies actual output (byref) parameters with permissions that are identical to the corresponding formal parameters during method and delegate invocations because byrefs can be used for reading and storing. M stores references that are access compatible with the target storage location type such as if the storage location has the same or weaker permission than the source reference. Further, when M overrides a virtual method or implements an interface method, (1) all input (non-byref) parameters have the same or weaker permissions than the member declaration formals; (2) all byref parameters have identical isolation modifiers, and (3) the return type includes a permission modifier that is the same or stronger than the permission modifier of the return type of the member declaration. With these rules, M does not reveal references that may violate isolation permissions and thus access permissions remain valid for an entire method callgraph.

The following pseudo code is used as an illustration:

```
class C {
    private T:w m_f;
    public C( ) { m_f = new T( ); }
    public isolated:r T:r Get ( ) { return m_f; }
    public isolated:w void Set(T:w obj) { m_f = obj; }
}
```

The field m_f is marked with a T:w permission, and receives and stores via the "Set" method objects that have T:w permission. Any exposure of the internal object is done with a T:r permission via the "Get" method, and this is possible because T:w implicitly coerces to T:r. The notational convention of "isolated:x" is used to denote the hidden "this" argument of the method has the permission x, so in the example "Get" operates with "this:r" and "Set" operates with "this:w." Non-isolated methods can ignore access modifiers. Code at the boundary of the non-isolated code and isolated code coerces unadorned "T" references such that they include the appropriate permission modifiers.

An "isolated" delegate type "D" binds to an "isolated" method "M" where input and output parameters are access compatible with the delegate parameter. Establishing isolated delegates is similar to (but reversed) overriding virtual methods and implementing interface methods as described above. More particularly, input (non-byref) parameters can be stronger than the parameters of the target, byref parameters match permissions, and return type parameters can be weaker than the parameters of the target.

For example, given a method "isolated void M(C:r c)" the following delegate types are evaluated as whether they are legal to bind against the method:
isolated delegate void A(C:w c); // Legal as strengthening.
isolated delegate void B(C:r c); // Legal as precise.
isolated delegate void C(C:i c); // Illegal as weakening.

Generics are also capable of respecting modifiers. For example, consider a generic delegate "isolated delegate U IsolatedFunc<T, U>(T e);" the actual parameters for "T" and "U" determine the methods it can bind itself to:

EXAMPLE 1

```
isolated C:r M(C:r c);
...
IsolatedFunct<C:r, C:r> a = M; // Legal as precise.
IsolatedFunct<C:i, C:r> b =M; // Legal as strengthening the input
    (covariance).
IsolatedFunct<C:r, C:i> c + M; // Legal as weakening output
    (contra-variance).
IsolatedFunct<C:w, C:i> c = M; // Legal as both
```

EXAMPLE 2

```
isolated static C:r M(C:r c);
...
IsolatedFunct<C:i, C:w> c = M; //Illegal as co- and contra-variance are
opposite.
```

Language authors are provided with the decision as to whether to support covariant and contra-variance similarly to overrides of methods as noted above.

During member access, the permissions of the contained expression type are combined with declared access permission of the member. For example, given a member access "o.M" where "o" is a reference of type "T:x" and "M" has a declared type of "U:y," the type of statement "o.M" will be U:min(x, y) where the resulting reference is no stronger than the weakest permission of the combination. In other words, given a T:x reference, any field U:y or value returned from a method U:y are morphed into U:min(x, y) such as:

$\{T{:}w{+}U{:}r\}{=}U{:}r$ $\{T{:}r{+}U{:}w\}{=}U{:}r$ $T{:}w{+}U{:}w{=}U{:}w$

These rules provide permissions granted to a single reference will also apply to the object graph reachable for that reference. For the example of a "Customer" type:

```
class Customer {
    puplic Order:w_order = ...;
}
``` and an instance from a context of read access:
Customer:r c= . . . ;
These rules provide that no writes to the_order are allowed:
c._order._total= . . . ; // error:_order is erased to Order:r, not
    Order:w
In another example, the system permits the ability to suppress checks for a region of code to enable preferred side-effects.

Byrefs—such as "out" and "ref" parameters—to fields are similar with the exception that the resulting type will become U&:min(x, y) instead of U:min(x, y). The "&" in this instance means "reference to a 'U' [reference]."
This byref rule protects against a possible elevation of privilege with a common practice of avoiding copying by accessing value type fields through byrefs.

The system further includes an ability to constrain generic type parameters. For example in the case where System.Object contains a method 'void isolated:r Equals(object:r other)'. If we write a List<T> class that checks two objects for equality (perhaps as part of implementing a 'bool isolated:r Contains(object:r obj)' method), it declares that T is at least readable, which can lead to:
T: immutable
T: immutable+
T: readable−
T: readable
T: readable+
T: writable−
T: writable Accordingly, the type system support for memory isolation permissions describes how to create regions of program scopes of isolated memory. As mentioned above, a "write"

reference points either at an object that is not concurrently shared with another thread or at a shared object that has been provided with exclusive access so that writing can be done safely. In certain circumstance, however, fine-grained concurrent access in the regions is desired, which introduces concurrent access. Read permissions can safely erase all concurrent access, but read permissions do not provide for concurrent mutation.

An abstraction called an IsolatedObjectGraph<T> can be built using the type system support described in FIG. 3 to provide for safe concurrent mutations of isolated object graphs and represents a fully isolated object graph. The IsolatedObjectGraph<T> uses the type system to encapsulate an entire object graph that is rooted by an instance of type T. The graphs can be fully generic as to the type permissions, and can include an immutable graph, a readonly graph, or fully mutable graph, or the like. The encapsulated object graph does not contain references to objects outside of the object graph, objects outside the graph do not contain references to objects within, and the desired properties are statically provable and can enable safe parallel mutation of object graphs. In one example, an imperative framework provides for statically proving the object graph to be isolated. Objects within the object graph can be run, read, and/or written, and the object graph can be statically proven to continue to be isolated. One example use of the IsolatedObjectGraph<T> is for constructs such as parallel foreach (or For-Each) loops or other safe data parallel operations.

Figure 4:
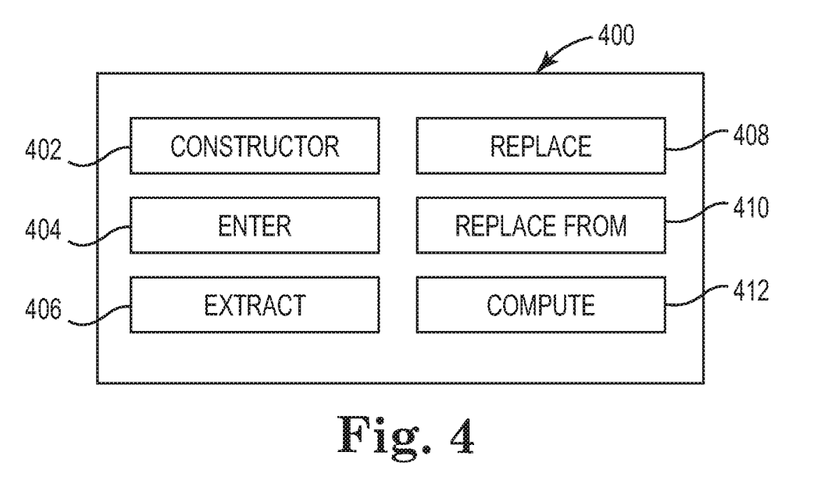
FIG. 4 is a block diagram illustrating an example embodiment of an interface of a method of a managed environment, such as the managed environment of FIG. 2.

FIG. 4 illustrates a public interface of the IsolatedObjectGraph<T> 400. The IsolatedObjectGraph<T> includes a constructor 402 and supports the combinators, or methods, of Enter 404, Extract 406, Replace 408, ReplaceFrom 410, and Compute 412 to interact with the object graph. The constructor 402 accepts a factory function that creates and returns the object root. This constructor runs in a context where only immutable state from the outside world is available, thus ensuring that the state returned must have been created by the function, and moreover is completely isolated. The Enter method 404 permits state to be read and optionally mutated from within the region. It also runs in an immutable context, so it cannot store any portion of the state anywhere, nor can it save references to objects outside of the graph within. The Extract method 406 permanently takes the state from the region. The Replace method 408 replaces the state in the region with state created by a provided function. The function is given access to the state currently inside the region, the replaced state can be a transformation of the state and is not a copy. The ReplaceFrom method 410 safely removes state from another IsolatedObjectGraph<T> and replaces and replaces the current state with it. The ReplaceFrom method 410 allows sideways copying to make possible storing state into a region from a location other than the region. The Compute method 412 provides access to the state and ability to return an immutable reference out of the region. The reference can point directly to a selected portion of the object graph, which is safe because the reference is immutable and therefore state modifications cannot be seen or induced via it.

An example definition of this type illustrated in FIG. 4 can be described as:

```
public class IsolatedObjectGraph<T> {
    public isolated:w IsolatedObjectGraph(FactoryFunc<T> factoryFunc)
    {
        m_state = factoryFunct( );
```

```
    }
    public isolated:r void Enter(EnterAction<T> enterAction) {
        return replace(_ => default (T));
    }
    public isolated:w T Replace(ReplaceFunc<T> replaceFunc) {
        T oldState = m_state;
        m_state = replaceFunc(oldState);
        return oldState;
    }
    public isolated:w T ReplaceFrom(IsolatedObjectGraphic<T>:w other)
    {
        return Replace(_ => other.Extract( ));
    }
    public isolated:r U Compute<U>(ComputeFunc<T, U> computeFunc)
    where U:I {
        return computeFunc(m_state);
    }
}
public isolated:i delegate T FactoryFunc<T>( );
public isolated:i delegate void EnterAction<T>(T state)
public isolated:i delegate ReplaceFunc<T>(T:r oldState);
public isolated:i delegate U ComputeFunc<T, U>(T:r state) where U:i;
```

The constructor 402 and its associated factoryFunc delegate (of type FactoryFunc<T>) are implemented as invoking the delegate provided and stores the result into the m_state field. The constructor 402, however, is marked with as isolated:w, which causes it to execute in an isolated region and has write permissions to its own object fields. The delegate type FactoryFunc<T> as an isolated delegate binds to isolated methods that execute within isolated regions. The delegate is marked isolated:i and binds itself to static methods or instance methods that have immutable access to the this reference. The method merely allocates new state, manipulates it, and eventually discards some of it and returns some of it. The method does not store the state.

The theme is continued with the other methods. For example, the state is not read directly from the graph. In order to subsequently interact with the state, an EnterAction is passed to the Enter method 404. As with FactoryFunc, the EnterAction delegate binds to other isolated:i methods so the EnterAction delegate does not keep a record of the state passed to it with the Enter method 404.

The Extract method 406, a single time operation, is used to extract the state. Once extracted, the object graph can be freely manipulated because the object graph will not be placed back into the region. The Replace method 408 provides for the generation of a new state to be placed back into the region. Much like FactoryFunc, ReplaceFunc executes within an isolated region and does not keep a record of any state.

The Compute method 412 provides for the computation of some state that is made available outside of the isolated method. This state in the example is of a type U that is immutable as it is indicated as U:i. Even if T and U represent the same base type, the state made available outside of the isolated region is immutable and will not be mutable through the use of this reference. States that are subsequently mutated inside the isolated region are not made available outside the region.

Figure 5:
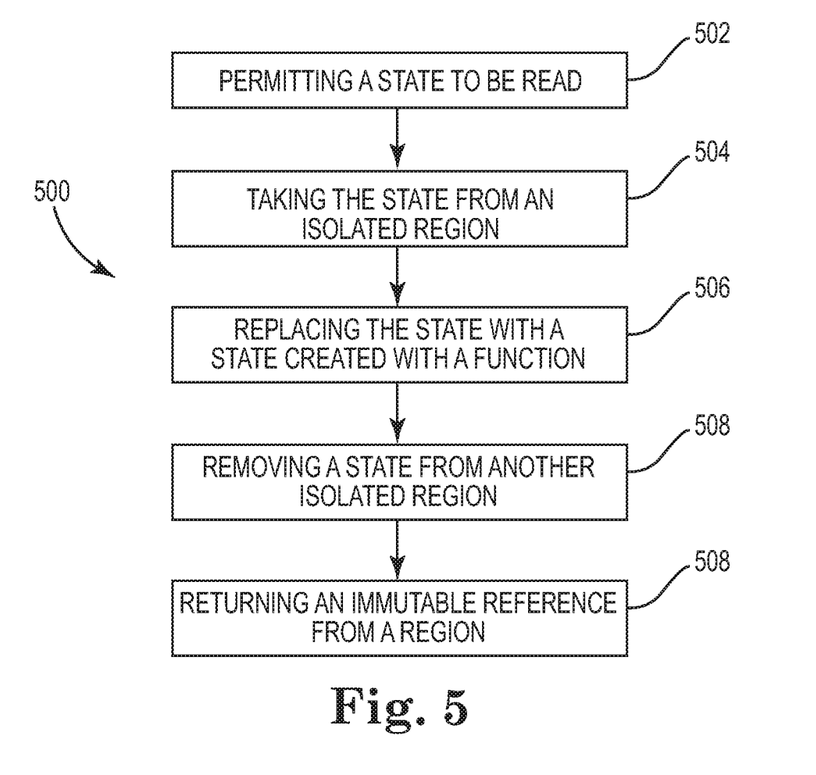
FIG. 5 is a flow diagram illustrating an example embodiment of a method of a managed environment, such as the managed environment of FIG. 2, where the embodiment of the method can be implemented with an embodiment of the interface of FIG. 4.

FIG. 5 illustrates a method 500 of the type illustrated in FIG. 4. The method permits a state to be read from an isolated region at 502. The state is then taken from the region at 504. The state taken from the region is replaced with another state, which was created from a provided function at 506. The method also allows removal of a state from another IsolatedObjectGraph<T> and replaces the current state with the state from the another IsolatedObjectGraph<T> at 508.

The method then returns an immutable reference from the region at 510. It is contemplated that the method can be performed without type permissions.

The data structure described above enables safe mutation of object graphs in parallel. For example, given a Set<T> type that has unique elements, a ParallelForEach construct that accepts a Set<IsolatedObjectGraph<T>:w> can be declared and can concurrently invoke the Enter method 404. Within the delegate supplied, state can be changed, for example, with:

public void ParallelForEach<T> (Set<IsolatedObjectGraph<T>:w>r source, EnterAction<T> action);

In the limit, ParallelForEach can enter each IsolatedObjectGraph<T> in the set at once, including one per processor in the computing device 100 with standard static and/or dynamic partitioning techniques.

Even though the implementation of this method is unsafe dynamically (because it introduces concurrency), all code leading up to the call is statically verified through a runtime compiler 136, such as the common language runtime (CLR) in the .NET framework. Further, all user-supplied code invoked with the ParallelForEach is also statically verified. The method is safe when (1) the Set<T> correctly verifies dynamic uniqueness, (2) the partitioning algorithm does not assign duplicate elements to separate dynamic threads, and (3) each element of the set is a statically isolated object graph. This will reduce the scope of dynamic verification of safety to the implementation of Set<T> and ParallelForEach, both of which are normally trusted system components.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of providing state isolation in a data parallel operation, the method comprising:
    defining a plurality of permissions with corresponding modifiers to control access to members via references pointing at objects of the operation, the permissions including:
        an immutable permission in which an immutable reference points at an object shared between concurrent threads of the operation but state accessed through the object is proven not to change to an immutable field;
        a read permission in which a read reference points at an object shared between concurrent threads in which there are no concurrent writes, the read permission allows immutable access and reads of mutable fields via concurrency safety to prevent concurrent writes; and
        a write permission in which a write reference points at an object that is not shared between concurrent threads or includes exclusive access in which a write to the reference is done with safe concurrency to a mutable field;
    associating one of the plurality of modifiers corresponding with a permission of the plurality of permissions with a type name for a respective data type for all occurrence of the type name including specifying an isolation modifier notation with the type name in a formal parameter declaration to control access to type members;
    encapsulating an object graph to an isolation region with a permission of the plurality of permissions with the corresponding modifier, the object graph is rooted by an instance of the type members such that the object graph does not contain references to objects outside of the object graph and references outside of the object graph do not have references to objects within the object graph; and
    implementing the object graph with a compiler such that mutations of state within the object graph are not made available outside of the isolation region to enable a safe data parallel operation within the object graph, wherein the object graph is statically proven to be isolated after running, reading, or writing the objects within the object graph.

2. The method of claim 1 wherein the plurality of permissions are type permissions.

3. The method of claim 2 wherein the corresponding modifiers are type modifiers.

4. The method of claim 3 wherein an unadorned type is an immutable permission.

5. The method of claim 1 wherein the data parallel operation is an isolated method.

6. The method of claim 1 wherein the state accessible through the immutable permission is statically proven not to change.

7. The method of claim 1 wherein the state accessible through the read permission includes immutable access and reads of mutable fields.

8. The method of claim 1 wherein the state accessible through the write permission is read-write to a member.

9. The method of claim 1 wherein the plurality of permissions are extended to methods.

10. The method of claim 9 wherein the permissions bind to delegates.

11. A system to provide state isolation, the system comprising:
    memory to store a set of instructions and receive a data parallel operation; and
    a processor to execute the set of instructions and the data parallel operation to:
    define a plurality of permissions with corresponding modifiers to control access to members via references pointing at objects of the operation, the permissions including:
        an immutable permission in which an immutable reference points at an object shared between concurrent threads of the operation but state accessed through the object is proven not to change to an immutable field;
        a read permission in which a read reference points at an object shared between concurrent threads in which there are no concurrent writes, the read permission allows immutable access and reads of mutable fields via concurrency safety to prevent concurrent writes; and
        a write permission in which a write reference points at an object that is at least one of not shared between concurrent threads and includes exclusive access in which a write to the reference is done with safe concurrency to a mutable field;
    associate one of the plurality of modifiers corresponding with a permission of the plurality of permissions with a type name for a respective data type for all occurrence of the type name including specifying an isolation modifier notation with the type name in a formal parameter declaration to control access to type members;

encapsulate an object graph to an isolation region with a permission of the plurality of permissions with the corresponding modifier, the object graph is rooted by an instance of the type members such that the object graph does not contain references to objects outside of the object graph and references outside of the object graph do not have references to objects within the object graph; and implement the object graph such that mutations of state within the object graph are not made available outside of the isolation region to enable a safe data parallel operation within the object graph, wherein the object graph is statically proven to be isolated after running, reading, or writing the objects within the object graph.

12. The system of claim 11 wherein the encapsulated object graph includes a generic type parameter.

13. The system of claim 11 wherein the permissions state what a recipient of the reference can do with the object.

14. The system of claim 11 included in a managed environment.

15. The system of claim 11 wherein the object graph is implemented with a language compiler.

16. A computer readable storage device, which does not include a propagating signal, to store computer executable instructions to control a processor to:

define a plurality of permissions with corresponding modifiers to control access to members via references pointing at objects of the operation, the permissions including:

an immutable permission in which an immutable reference points at an object shared between concurrent threads of the operation but state accessed through the object is proven not to change to an immutable field;

a read permission in which a read reference points at an object shared between concurrent threads in which there are no concurrent writes, the read permission allows immutable access and reads of mutable fields via concurrency safety to prevent concurrent writes; and a write permission in which a write reference points at an object that is at least one of not shared between concurrent threads and includes exclusive access in which a write to the reference is done with safe concurrency to a mutable field;

associate one of the plurality of modifiers corresponding with a permission of the plurality of permissions with a type name for a respective data type for all occurrence of the type name including specifying an isolation modifier notation with the type name in a formal parameter declaration to control access to type members;

encapsulate an object graph to an isolation region with a permission of the plurality of permissions with the corresponding modifier, the object graph is rooted by an instance of the type members such that the object graph does not contain references to objects outside of the object graph and references outside of the object graph do not have references to objects within the object graph; and implement the object graph such that mutations of state within the object graph are not made available outside of the isolation region to enable a safe data parallel operation within the object graph, wherein the object graph is statically proven to be isolated after running, reading, or writing the objects within the object graph.

17. The computer readable storage device of claim 16 wherein the object graph is implemented in a language compiler.

18. The computer readable storage device of claim 17 wherein the language compiler is an imperative programming language.

19. The computer readable storage device of claim 16 wherein the plurality of permissions apply an immutable field.

20. The computer readable storage device of claim 16 wherein the permissions are applied to at least one of a type and isolated method.

* * * * *